United States Patent [19]

Strong et al.

[11] Patent Number: 4,712,568
[45] Date of Patent: Dec. 15, 1987

[54] COMBINE SIEVE ADJUSTMENT MECHANISM

[75] Inventors: Russell W. Strong, Brugge, Belgium; Kenneth S. Rutt, Lancaster, Pa.

[73] Assignee: New Holland Inc., New Holland, Pa.

[21] Appl. No.: 837,913

[22] Filed: Mar. 10, 1986

[51] Int. Cl.$^4$ ............................................. A01F 12/44
[52] U.S. Cl. ...................... 130/272; 209/394
[58] Field of Search .................. 209/394; 130/24, 26, 130/272; 56/16.5; 74/547

[56] References Cited

U.S. PATENT DOCUMENTS

| | | | |
|---|---|---|---|
| 695,104 | 3/1902 | Hixson | 209/394 |
| 724,419 | 4/1903 | Andrews . | |
| 769,111 | 8/1904 | Pierce . | |
| 1,501,605 | 7/1924 | Lane | 74/547 |
| 1,828,980 | 10/1931 | Nixon et al. | 74/547 |
| 2,156,569 | 5/1939 | Lindgren et al. . | |
| 2,253,296 | 8/1941 | Holtzman | 209/394 |
| 2,413,382 | 12/1946 | Sargent et al. | 209/394 |
| 2,428,294 | 9/1947 | Ross | 209/394 |
| 3,334,744 | 8/1967 | James et al. . | |
| 3,385,438 | 5/1968 | Fisher | 209/394 |
| 3,593,719 | 7/1971 | Ashton et al. | 130/26 |

Primary Examiner—Stephen J. Novosad
Assistant Examiner—Bruce M. Kisliuk
Attorney, Agent, or Firm—Larry W. Miller; Frank A. Seemar; Darrell F. Marquette

[57] ABSTRACT

An adjustment mechanism to affect a change in the size of openings through a sieve in a combine harvester is disclosed wherein the handle for actuating the sleeve adjustment is positioned above the surface of the sieve to permit an ease and convenience of access. The handle is pivotally connected to a pivot member and movable between a retracted position in which the handle presents a streamlined profile to minimize obstruction to the flow of crop material thereover and an actuating position in which an engagement pin in said handle is engageable with a notch formed in the upper surface of the pivot member to permit the handle to actuate movement of the pivot member, which in turn is transferred into a fore-and-aft motion of a slat connection member interconnecting the sieve slats to be adjusted to affect a pivotal movement thereof. The adjusted position of the sieve slats is maintained by a combination of the friction between the friction disks and the pivot member and a clamping force of a spring clip retaining the handle in its retracted position.

10 Claims, 4 Drawing Figures

COMBINE SIEVE ADJUSTMENT MECHANISM

BACKGROUND OF THE INVENTION

The present invention relates generally to combine harvesters and, more particularly, to an adjustment mechanism for the sieves in a combine grain cleaning mechanism.

The cleaning mechanism in a combine harvester typically includes an upper chaffer sieve and a lower cleaning sieve. Grain received from the threshing and separating mechanism passes over the upper chaffer sieve where air is blown upwardly therethrough to remove chaff and other residual debris from the grain thereon to permit the grain to pass therethrough to the cleaning sieve where the cleaning action is duplicated. Each sieve is generally constructed of a series of transversely extending and pivotally mounted slats, each of which has a convoluted shape to define openings therethrough. The size of these openings, through which cleaned grain will pass, is determined by the pivoted position of the individual slats. Typically, a manual adjustment mechanism will interconnect all of the pivoted slats to control the pivoted position thereof and, therefore, the size of the openings through the sieve.

Generally, these adjustment mechanisms incorporate a handle mounted beneath the sieves to eliminate any problem of the handle impeding the flow of material over top of the sieve. However, accessing the adjustment handles on such cleaning sieves is often difficult because of raking members or other optional equipment mounted at the rear of the sieve, where access to the adjustment mechanism can be reached. Accordingly, it would be advantageous to provide a sieve adjustment mechanism in which the handle is mounted above the surface of the sieve in such a manner as not to affect the function of the sieve or obstruct the flow of crop material across the upper surface of the sieve.

SUMMARY OF THE INVENTION

It is an object of this invention to overcome the aforementioned disadvantages of the prior art by providing a sieve adjustment mechanism having a handle extending above the upper surface of the sieve.

It is another object of this invention to pivotally connect the handle of the adjustment mechanism to a pivot member to permit the handle to be moved between a retracted position and an actuating position.

It is a feature of this invention that the sieve adjustment mechanism can be easily reached to affect manipulation thereof.

It is an advantage of this invention that the handle positioned in its retracted position presents a streamlined profile to minimize obstruction therefrom to the flow of crop material over the surface of the sieve.

It is another advantage of this invention that the location of the handle for the sieve adjustment mechanism does not interfere with the installation of grain loss sensors across the entire width of the rear of the sieve.

It is another feature of this invention that a friction disk is incorporated into the sieve adjustment mechanism to assist in holding selected pivoted position of the slats in the sieve.

It is a further advantage of this invention that the handle is retained in its retracted position by a spring clip.

It is yet another feature of this invention to provide an engagement pin on the handle to be engageable with a notch in the pivot member to permit the motion of the handle to be transferred to the pivot member and, thereby, affect a pivotal movement of the slats in the sieve.

It is still another object of this invention to provide a manual sieve adjustment mechanism accessible above the surface of the sieve without interferring with or obstructing the flow of crop material over the surface of the sieve.

It is still another feature of this invention that the sieve adjustment mechanism can be utilized on the chaffer sieve extension, as well as on the chaffer sieve.

It is yet another object of this invention to provide a sieve adjustment mechanism which is durable in construction, inexpensive of manufacture, carefree of maintenance, facile in assemblage, and simple and effective in use.

These and other objects, features and advantages are accomplished according to the instant invention by providing an adjustment mechanism to affect a change in the size of openings through a sieve in a combine harvester wherein the handle for actuating the sieve adjustment is positioned above the surface of the sieve to permit an ease and convenience of access. The handle is pivotally connected to a pivot member and movable between a retracted position in which the handle presents a streamlined profile to minimize obstruction to the flow of crop material thereover and an actuating position in which an engagement pin in said handle is engageable with a notch formed in the upper surface of the pivot member to permit the handle to actuate movement of the pivot member, which in turn is transferred into a fore-and-aft motion of a slat connection member interconnecting the sieve slats to be adjusted to affect a pivotal movement thereof. The adjusted position of the sieve slats is maintained by a combination of the friction between the friction disks and the pivot member and a clamping force of a spring clip retaining the handle in its retracted position.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
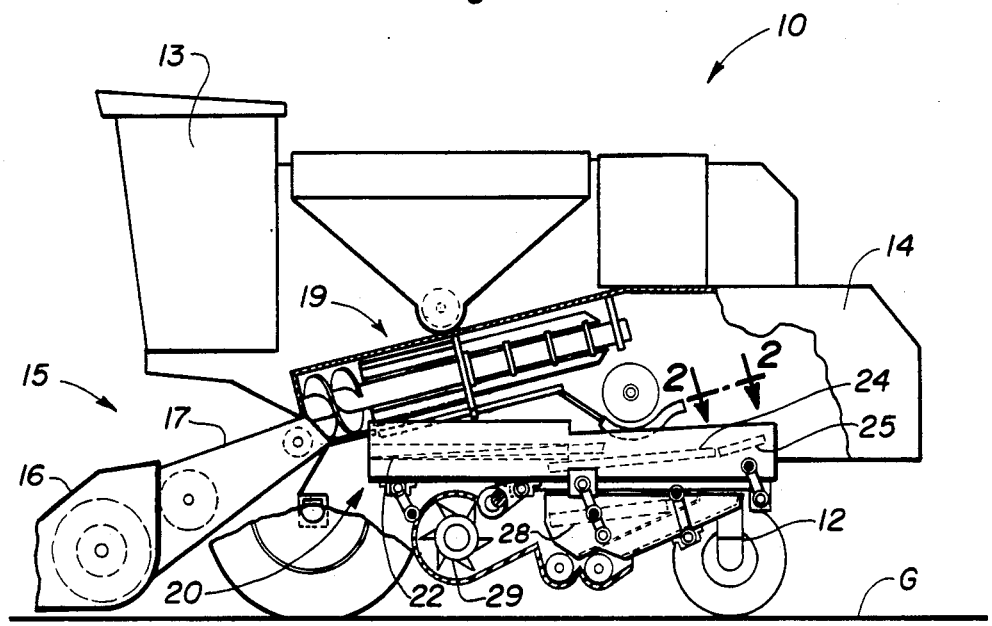
FIG. 1 is a schematic side elevational view of a combine harvester with portions thereof broken away to show the relative positions of the various components thereof.

Referring now to the drawings and, particularly, to FIG. 1, a schematic side elevational view of a crop harvesting machine, commonly referred to as a combine, can be seen. Any left and right references are used as a matter of convenience and are determined by standing at the rear of the machine, facing the forward end, the direction of travel. The combine 10 is mobilely supported over the ground G by a wheeled frame 12. The wheeled frame 12 supports an operator's cab 13, a crop gathering mechanism 15, a threshing and separating mechanism 19 and a cleaning mechanism 20 to harvest crop from the ground G.

More specifically, standing crop is gathered from the ground G by the crop gathering mechanism 15, shown in the form of a header 16 and a feederhouse 17. The crop collected by the header 16 is consolidated and fed into the feederhouse 17 which in turn delivers the crop material, including grain and trash material to the threshing and separating mechanism 19. The threshing and separating mechanism 19 removes grain from the crop material where it is received by the cleaning mechanism which is typically reciprocated in a fore-and-aft direction to convey the grain rearwardly. The grain is received on a grain pan 22 and conveyed rearwardly unto a chaffer sieve 24 through which air is blown by a fan 29 to remove residual debris therefrom. Cleaned grain passing through the chaffer sieve 24 is received by a lower cleaning sieve upon which the cleaning action is duplicated. As shown in FIG. 1, the chaffer sieve 24 can be provided with a chaffer sieve extension 25 upon which the details of the instant invention is exhibited below.

Figure 2:
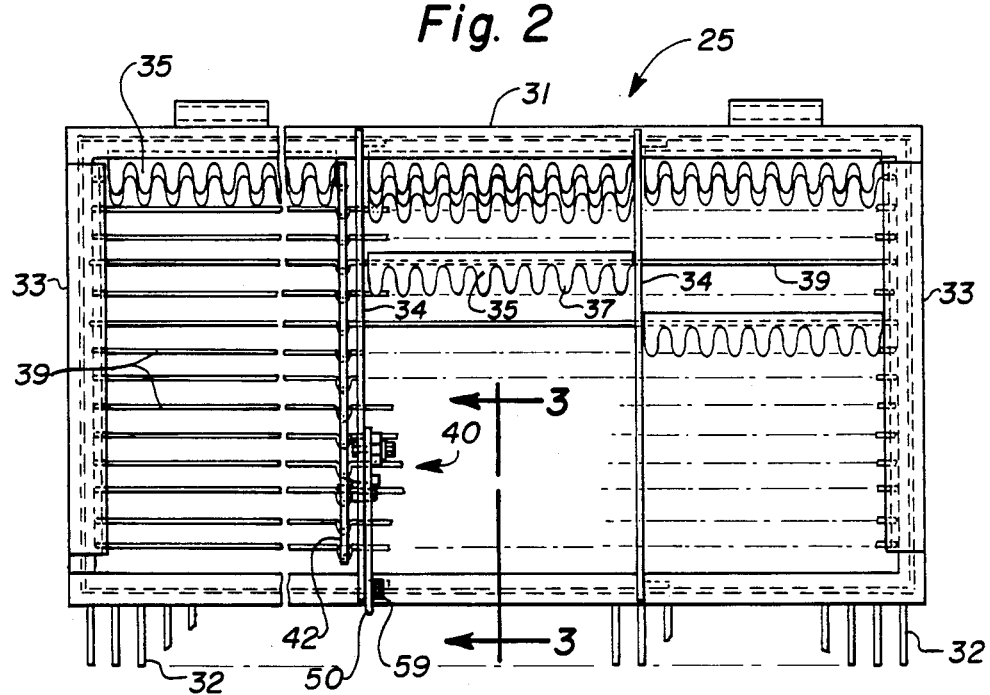
FIG. 2 top plan view of the chaffer sieve extension corresponding to lines 2—2 of FIG. 1, the slats being representatively shown, portions of the chaffer sieve extension being broken away for purposes of clarity.

The construction of the sieves is respectively shown by the chaffer sieve extension 25 in FIG. 2. The sieve 25 is provided with a frame 31, including side frame members 33 and fore-and-aft extending ribs 34. The sieve 25 also includes a plurality of transversely extending and elongitudinally spaced slats or louvers 35 having a convoluted shape, as representatively shown in FIGS. 2 and 4, including rearwardly directed bills 37, defining openings therethrough for the passage of cleaned grain. The sieve extension 25 can also be provided with optional raking members 32 which can extend across the entire transverse width of the sieve 25. Optional grain loss monitors (not shown) can replace all or portions of the raking members 32 or be used at the rear of the optional raking members.

Figure 3:
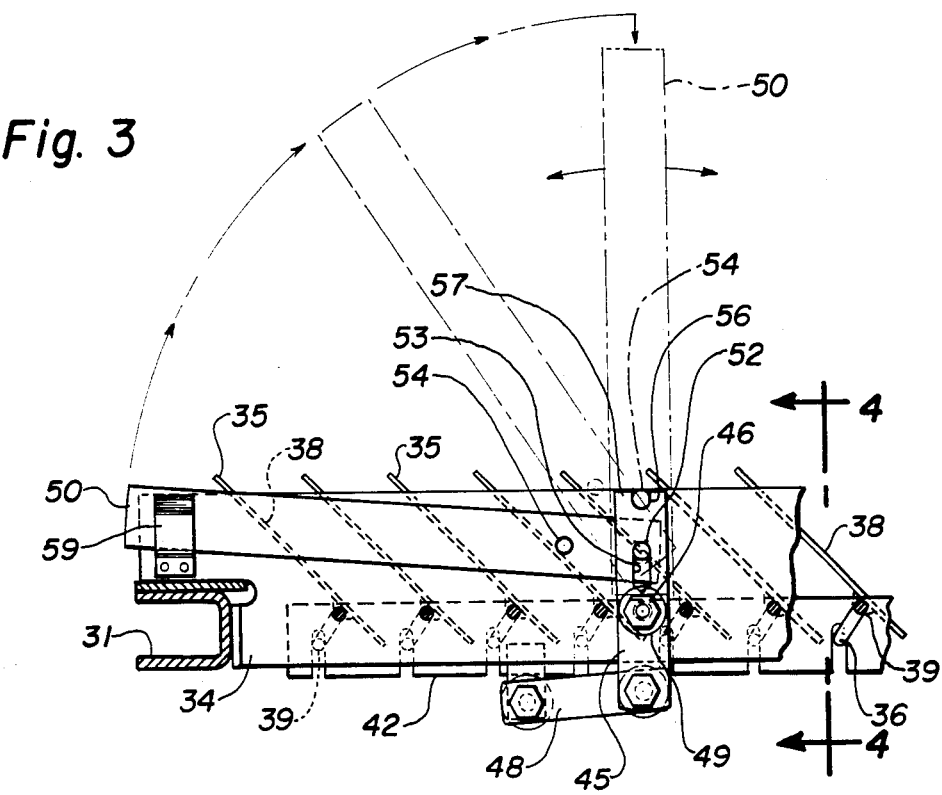
FIG. 3 an enlarged cross-sectional detailed view of the sieve adjustment mechanism taken along lines 3—3 of FIG. 2, the movement of the handle. into its actuating position being shown in phantom.
Figure 4:
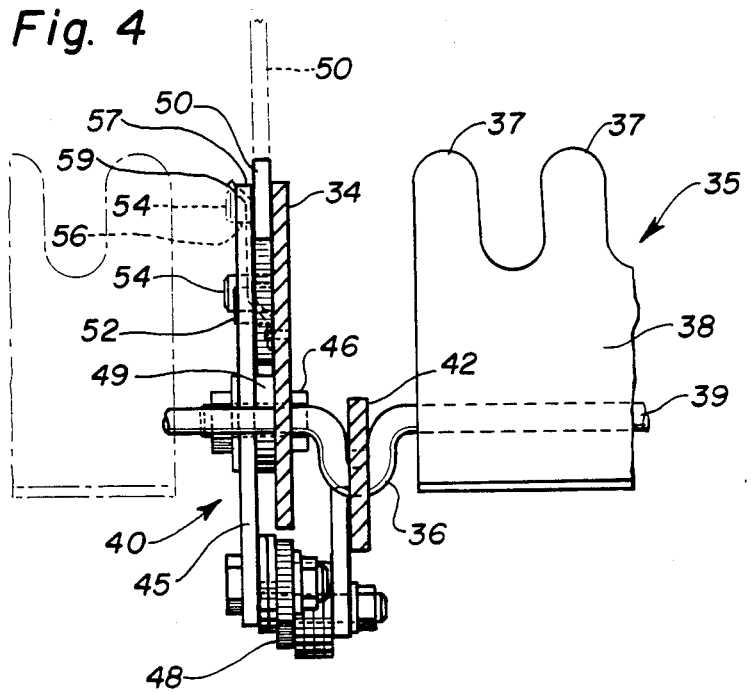
FIG. 4 an enlarged cross-sectional detailed view of the sieve adjustment mechanism shown in direction of crop flow over the surface of the sieve as represented by lines 4—4 of FIG. 3.

Referring now to FIGS. 2-4, it can be seen that the louvers 35 are formed from a relatively flat sheet of metal forming a body portion 38 and integral bills 37 that are fixed to a rod 39 rotatably journalled in the opposing side frame members 33 and the fore-and-aft extending ribs 34. Each rod 39 has a curved portion 36 that is engageable with the adjustment mechanism 40 to control the pivoted position of the louvers 35.

The adjustment mechanism 40 includes a fore-and-aft extending slat connection member 42 interconnecting the respective curved portions 36 of the individual rods 39 of the louvers 35 in the sieve 25. It can best be seen in FIG. 3 that a fore-and-aft movement of the slat connection member 42 will affect a simultaneous corresponding rotation of each of the rods 39 to pivotally move the slats 35. The convoluted shape of the slats 35 form the openings through the sieve 25. One skilled in the art will readily realize that the respective pivoted positions of the slats 35 determine the size of the openings through the sieve 25. The adjustment mechanism 40 also includes a pivot member 45 pivotally mounted to the adjacent rib 34 by a pivot bolt 46 permitting the pivot member to rotate in a longitudinal plane. The pivot member 45 is connected to the slat connection member 42 by a link 48, so that pivotal movement of the pivot member 45 is transposed into a fore-and-aft motion of the slat connection member 42, which, in turn, pivotally adjusts the louvers or slats 35. A friction disk 49 disposed between the rib 34 and the pivot member 45 restricts the freedom of the pivot member 45 to rotate in its longitudinal plane by requiring a given force to rotate the pivot member 45.

A handle 50 is pivotally connected to the pivot member 45 by a pivot pin 52 passing through a slot-shaped hole 53 in the pivot member 45. The handle 50 is provided with an engagement pin 54 that is selectively engageable with a notch 56 formed in the upper surface 57 of the pivot member 45. The handle 50 is also engageable with a spring clip 59 affixed to the adjacent rib 34. As best seen in FIGS. 3 and 4, the handle 50 is movable from a retracted position, shown in solid lines, to an actuating position, shown in phantom. The spring clip 59 is operable upon engagement with the handle 50 to retain the handle 50 in its retracted position which presents a streamlined profile to the flow of crop material passing over the sieve 25. Movement of the handle 50 into its actuating position, shown in phantom FIGS. 3 and 4, permits the engagement pin 54 to be received within the notch 56 in the pivot member 45. The interengagement between the engagement pin 54 and the notch 56 permits the operator to use the handle 50 to overcome the frictional forces imposed by the friction disk 49 and affect pivotal movement of the pivot member 45 and, consequently, affect an adjustment of the pivot position of the slats 35.

During normal operation of the combine 10 to harvest crop material from the ground G, the handle 50 is retained in its retracted position in engagement with the spring clip 59, which presents a streamlined profile to prevent crop material from hairpinning over the handle 50 and thereby obstructing the flow of grain and associated crop material across the sieve 25. If the operator desires to change the size of the opening through the chaffer sieve extension 25, he would stop operation of the combine 10 and gain access to the adjustment mechanism 40 through the rear of the combine 10 underneath the straw hood 14. By moving the handle 50 from its retracted position engaged with the spring clip 59 to its actuating position wherein the engagement pin 54 is received within the notch 56, the sieve openings can be adjusted by pivoting the pivot member 45 and affecting a consequential fore-and-aft movement of the slat connection member 42. After the desired sieve opening size is attained, the handle 50 can be returned to its retracted position engaged with the spring clip 59. It should be noted that the slot shaped hole 53 permits an axial movement of the handle 50 relative to the pivot member 45 to facilitate an engagement of the engagement pin 54 with the notch 56, yet helps retain the handle 50 in its retracted position by limiting the capability of the handle to move in a fore-and-aft direction. The position of the louvers 35 is maintained by a combination of the friction force between the friction disk 49 and the pivot member 45 and the clamping force of the spring clip 59 against the handle 50.

It will be understood that changes in the details, materials, steps and arrangement of parts whict have been described and illustrated to explain the nature of the invention will occur to and may be made by those skilled in the art upon a reading of this disclosure, within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a combine having a mobile frame adapted for movement over a field to harvest crop material therefrom; crop gathering means supported from said frame to gather crop material, including both grain crop and trash material, from the field; threshing and separating means mounted on said frame to receive crop material from said crop gathering means and process said crop material to remove said grain crop from the trash material; and cleaning means supported on said frame proximate to said threshing and separating means to receive grain crop therefrom and further separate said grain crop from any residual trash material associated therewith, said cleaning means including an adjustable sieve having a plurality of transversely extending slats pivotally mounted in a sieve frame and an adjustment mechanism operatively connected to said slats to pivotally move said slats within said sieve frame, said slats defining openings through said sieve to permit the passage of said grain, the size of said openings being variable with the pivoted movement of said slats, an improved adjustment mechanism comprising:

a fore-and-aft extending slat connection member interconnecting said slats to effect a simultaneous pivotal movement thereof upon a fore-and-aft movement of said slot connection member;

an upwardly extending pivot member pivotally mounted on said sieve frame and connected to said slat connection member so that a pivotal movement of said pivot member causes a corresponding fore-and-aft movement of said slot connection member; and a retractable handle connected to said pivot member and being movable into an actuation position in which said handle extends upwardly above said sieve and can be operable to effect pivotal movement of said pivot member, said handle also being movable to a retracted position to minimize the obstruction therefrom to the flow of crop material across said sieve.

2. The combine of claim 1 wherein the transverse width of said sieve is defined by opposing side sieve frame members in which said slats are pivotally journalled, said sieve frame also including at least one fore-and-aft extending rib intermediate said side sieve frame members, said pivot member being mounted on said rib.

3. The combine of claim 2 wherein said pivot member has an upper surface with a notch formed therein, said handle having a pin projecting therefrom and being selectively engageable with said notch to transfer movement of said handle into pivotal movement of said pivot member.

4. The combine of claim 3 wherein said handle is pivotally connected to said pivot member to permit movement of said handle between said actuation position and said retracted position.

5. The combine of claim 4 wherein said handle is positioned parallel to said rib when in said retracted position, said handle being retained in said retracted position by a spring clip fastened to said rib.

6. The combine of claim 5 wherein the pivotal movement of said pivot member is restricted by a friction disk mounted at the pivot connection between said pivot member and said rib.

7. The combine of claim 6 wherein said pivot member is formed with a slotted hole through which a pivot pin pivotally connecting said handle to said pivot member passes, said slotted hole permitting an axial movement of said handle relative to said pivot member to facilitate the engagement of said handle pin with the corresponding notch in said pivot member.

8. An adjustment mechanism for a combine cleaning sieve having a plurality of transversely extending slats pivotally supported in a sieve frame, said adjustment mechanism being operable to pivotally move said slats to vary the size of openings defined by said slats to permit the passage of grain therethrough, comprising a fore-and-aft extending slat connection member connected to said slats to effect a simultaneous pivotal movement of all slats connected thereto in response to a fore-and-aft movement of said slot connection member;

an upwardly extending pivot member pivotally mounted on said sieve frame and connected to said slat connection member so that a pivotal movement of said pivot member effects a corresponding fore-and-aft movement of said slot connection member, said pivot member having an upper surface with a notch formed therein; and a handle pivotally connected to said pivot member by a pivot pin extending through a slot-shaped opening in said pivot member, said handle having an engagement pin positionable within said notch to permit a pivotal movement of said pivot member to be induced by a corresponding movement of said handle, said handle being positionable between an actuating position in which said engagement pin is received within said notch and in which said handle projects upwardly from said cleaning sieve and a retracted position in which said handle presents a streamlined profile to the flow of crop material passing over said cleaning sieve, the slot-shaped hole in said pivot member permitting axial movement of said handle relative to said pivot member to facilitate the receiving of said engagement pin within said notch.

9. The adjustment mechanism of claim 8 wherein said sieve frame includes an intermediate fore-and-aft extending rib pivotally mounting said pivot member, said rib having a spring clip mounted thereon to engage and retain said handle in said retracted position.

10. The adjustment mechanism of claim 9 wherein the pivotal movement of said pivot member is restricted by a friction disk mounted at the pivotal connection between said pivot member and said rib.

* * * * *